(12) United States Patent
Ionov

(10) Patent No.: US 6,640,020 B2
(45) Date of Patent: Oct. 28, 2003

(54) METHOD AND APPARATUS FOR ELECTRO-OPTIC DELAY GENERATION OF OPTICAL SIGNALS

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/223,848

(22) Filed: Aug. 19, 2002

(65) Prior Publication Data

US 2003/0048971 A1 Mar. 13, 2003

Related U.S. Application Data

(62) Division of application No. 09/545,632, filed on Apr. 7, 2000, now Pat. No. 6,466,703.

(51) Int. Cl.[7] .......................... G02F 1/295; G02F 2/295
(52) U.S. Cl. ............................................ 385/10; 372/99
(58) Field of Search .......................... 385/10, 4–9, 27, 385/39, 47; 372/25, 36, 38, 6, 99, 45, 46, 50; 357/98; 257/83, 97, 94

(56) References Cited

U.S. PATENT DOCUMENTS

| | | |
|---|---|---|
| 3,961,841 A | 6/1976 | Giordmaine |
| 4,584,720 A | 4/1986 | Garrett |
| 4,923,264 A | 5/1990 | Langer et al. |
| 4,953,939 A | 9/1990 | Epworth |
| 5,082,342 A | 1/1992 | Wight et al. |
| 5,105,301 A | 4/1992 | Campi |
| 5,305,336 A | 4/1994 | Adar et al. |
| 5,608,566 A | 3/1997 | Dutta et al. |
| 5,715,265 A | 2/1998 | Epworth |
| 5,751,466 A | 5/1998 | Dowling et al. |
| 5,870,417 A | 2/1999 | Verdiell et al. |
| 5,912,999 A | 6/1999 | Brennan, III et al. |
| 6,018,534 A | 1/2000 | Pan et al. |
| 6,167,072 A | 12/2000 | Zory, Jr. |
| 6,243,517 B1 | 6/2001 | Deacon |
| 6,466,703 B1 * | 10/2002 | Ionov .......................... 385/10 |

OTHER PUBLICATIONS

Matuscheck, et al., *Theory of Double–Chirped Mirrors*. IEEE Journal of Selected Topics in Quantum Electronics, vol. 4, No. 2, pp. 197–208 (Mar./Apr. 1998).

* cited by examiner

Primary Examiner—Akm Enayet Ullah
(74) Attorney, Agent, or Firm—Ladas & Parry

(57) ABSTRACT

An optical delay generator includes a waveguide made from electro-optically active material which contains a chirped distributed Bragg reflector. An electric field generated across the waveguide causes the index of refraction within the waveguide to change. A change in the index of refraction results in a change in the point at which light is reflected from the chirped distributed Bragg reflector within the waveguide, thus providing a controllable delay for optical pulses. Optical pulse position modulation is provided by using the optical delay generator to control the delay imparted on each pulse within a stream of equally-spaced optical pulses.

3 Claims, 7 Drawing Sheets

METHOD AND APPARATUS FOR ELECTRO-OPTIC DELAY GENERATION OF OPTICAL SIGNALS

This is a divisional of application Ser. No. 09/545,632, filed Apr. 7, 2000, now U.S. Pat. No. 6,466,703.

FIELD OF THE INVENTION

The present invention relates to the processing of optical signals and, more particularly, to delaying optical signals.

BACKGROUND OF THE INVENTION

Many satellite and terrestrial optical communication systems require transmission of analog optical signals. One mechanism for the transmission of analog optical signals is through the use of some sort of pulse modulation, where a stream of optical pulses is modulated by an analog signal. Pulse Position Modulation (PPM) is a well-known modulation technique for radio-frequency transmissions. It is also used in analog optical communications. In PPM, a shift in the position of each pulse represents a sample of the original analog signal. Since the pulse repetition frequency (PRF) of the optical pulses must be greater than twice the bandwidth of the analog signal to correctly sample the analog signal, PRFs for optical communications will be quite high. For example, an optical inter-satellite link designed to transmit waveforms with a bandwidth of 20 GHz requires a PRF of over 40 GHz.

The optical pulses within the stream should be of short duration, since it is well known in the art that PPM signal-to-noise ratio (SNR) performance improves as the pulse widths within the modulated pulse stream decrease. Pulse widths as short as 0.3 picoseconds may be desirable for a PPM optical communication system. However, is also well known in the art that PPM performance will suffer if the shapes of the optical pulses vary or the amplitudes of the pulses vary on a pulse-to-pulse basis. Mode locking of a pulsed laser is a mature technique for producing equally spaced ultra-short identical pulses. It would be beneficial to use a mode-locked laser in a PPM communication system if the equally-spaced pulses produced by the system could be modulated without distortion.

Therefore, implementations of PPM for optical communications require a mechanism for modulating the delays between extremely short optical pulses within a pulse stream without modulating the shapes or pulse-to-pulse amplitudes of the pulses. Direct modulation of a semiconductor laser will appropriately modulate the delay between the optical pulses generated by the laser. However, a directly modulated semiconductor laser generates relatively long pulses that result in limited SNR performance. Pulse compression can be used on the longer pulses produced by the directly modulated semiconductor laser, but devices to provide such compression are complex and cumbersome. Direct modulation of a semiconductor laser may also introduce amplitude modulation or pulse reshaping of the individual time-shifted pulses, further limiting performance.

Pulse position modulation of extremely short optical pulses is also achieved by applying a pulse-to-pulse delay external to the source of the equally spaced optical pulses. That is, a method and apparatus are used that can receive a stream of optical pulses, change the pulse-to-pulse delay at the rate required for properly sampling the transmitted analog signal, and further transmit the delayed pulses. It is known in the art that one example of a pulse position modulator for optical pulses consists of an optical delay line, such as a parallel slab of transparent electro-optically active material. The refractive index of the electro-optically active material can be controllably varied by an applied voltage, so that each pulse is controllably delayed upon traversing the electro-optically active material in accordance with the instaneous voltage. However, such a modulator requires an undesirably large amount of electrical power, due to the relatively large voltages required to modulate the refractive index of the material and thus modulate the delay encountered by a pulse traversing the material.

Another example of a pulse position optical modulator relying upon the use of electro-optically active material is disclosed in U.S. Pat. No. 3,961,841, issued Jun. 8, 1976 to Giordmaine. Giordmaine discloses a device for optical pulse position modulation comprising a diffraction grating in combination with an electro-optic prism and a lens. The diffraction grating splits an incident light pulse into its frequency components and the lens directs the components into the prism. The refractive index change provided by the prism causes a phase shift in the frequency components and thus a time shift in the optical pulse once it is reconstructed by the diffraction grating. The device disclosed by Giordmaine provides the capability of modulating light pulses as short as one picosecond. However, the maximum controllable delay is limited to a few picoseconds for a 3 picosecond pulse and further decreases for shorter pulses. Also, the multiplicity of optical elements such as the diffraction grating, lens, and prism increase the complexity and manufacturing cost of the device.

A device for delaying optical pulses is disclosed in U.S. Pat. No. 5,751,466, issued May 12, 1998 to Dowling et al and is shown in FIG. 1. Dowling discloses a photonic bandgap structure comprising a plurality of cells 18A–18N of width d in which the refractive index varies. The refractive index variation may be such that each cell comprises two layers of materials with two different indices of refraction $n_1$ and $n_2$. If the widths of the two layers within each cell are $\lambda/4n_1$ and $\lambda/4n_2$ where $\lambda$ is the free space wavelength of the optical pulse to be delayed, a distributed Bragg reflector structure is created. According to Dowling, the thickness and/or number of layers in the photonic bandgap structure and/or their indices of refraction are selected to produce a structure with a transmission resonance center frequency and bandwidth corresponding to the frequency and bandwidth of the optical pulse to be delayed. By matching the transmission resonance to the optical pulse, a controllable delay is imparted to the optical pulse without significantly altering the optical signal.

The device disclosed by Dowling requires that the thickness of each layer in the device be approximately one-half the wavelength of the incident optical pulse to form the photonic bandgap structure. The delay imparted on an optical signal by transmission through the structure will depend upon the number of layers and the indices of refraction within the layers. The structure can be thought of as essentially increasing the length of the waveguide in which it is contained, thus providing the desired delay. For example, Dowling discloses a simulation of a photonic bandgap structure that is 7 $\mu$m thick that provides a delay equivalent to an optical signal traveling through a 110 $\mu$m stucture, or a delay of about 0.4 picoseconds. Since the amount of delay from a single structure is relatively small, Dowling discloses that the structures can be successively coupled in a single device to provide additional delay. Of course, this increases the overall size of the device.

Dowling also discloses that the delay provided by a photonic bandgap structure can be varied by changing the indices of refraction within the layers of the structure. One way to accomplish this is to fabricate at least one of the layers from electro-optically active material. An applied voltage will then change the index of refraction in the layer to which the voltage is applied. FIG. 1 shows a voltage means 15 that applies a voltage to one or more of the layers within the device disclosed by Dowling. Varying the voltage would vary the delay, thus providing the controllable delay required for pulse position modulation. However, since the overall delay provided by photonic bandgap structure is relatively small, it would follow that the change of delay provided by electro-optically changing the indices of refraction would only be some fraction, typically 0.1% or less, of that relatively small delay. Again, this limitation could be overcome by coupling successive structures, with a corresponding increase in the overall size of the structure.

There exists a need for a high quality optical delay apparatus and method that provide large, controllable delays for short optical pulses. Moreover, the apparatus and method must be capable of providing the required delay without substantially altering the pulse-to-pulse amplitude or shape of the pulses in the original pulse stream. Additionally, it is important for the delay generation to be implemented in a compact, lightweight apparatus that is compatible with other integrated systems.

SUMMARY OF THE INVENTION

Accordingly, it is an object of the present invention to provide apparatus and methods for optical delay generation.

It is another object of the present invention to provide apparatus and methods for optical delay generation without causing pulse-to-pulse amplitude modulation or pulse reshaping of delayed optical pulses.

It is another object of the invention that the method and apparatus provide optical delay that can be used for pulse position modulation.

These and other objects are provided according to the present invention by transmitting optical pulses to be delayed into a waveguide means comprising electro-optically active material within which is formed a chirped distributed Bragg reflector (C-DBR) oriented in the direction of light propagation within the waveguide means. The chirped distributed Bragg reflector reflects light at different wavelengths at different points within the waveguide. An electric field generator generates and controls an electric field applied across the waveguide in a direction perpendicular to the direction of propagation. Changes in the electric field intensity cause changes in the index of refraction within the waveguide means, thus changing the point at which the optical pulses reflect from the chirped distributed Bragg reflector and are transmitted out of the waveguide means. Thus, optical delay generation is accomplished by controlling the intensity of the electric field across the chirped distributed Bragg reflector.

In a first specific embodiment of the present invention, the waveguide means comprises a straight waveguide constructed from electro-optically active material, such as lithium niobate, sandwiched between a top conductor and a bottom conductor. A chirped distributed Bragg reflector is formed in the waveguide by quasiperiodically corrugating the waveguide walls. A voltage source is connected to the top conductor and the bottom conductor such that a voltage between the two is created. The voltage causes an electric field to be generated across the chirped distributed Bragg reflector, thus changing the index of refraction as the voltage changes. An alternate embodiment uses a tapered waveguide in which the waveguide walls are periodically corrugated.

In a second embodiment of the present invention, the electro-optically active material used in the waveguide means comprises a semiconductor chirped distributed Bragg reflector structure with excitonic band just above the photon energy structure. The chirped distributed Bragg reflector is formed by the individual layers of semiconductor material. The refractive index and thickness of each layer vary from its neighbor so as to provide the quasiperiodic variation in refractive index required to form a chirped distributed Bragg reflector.

The chirped distributed Bragg reflector of an alternative embodiment of the present invention comprises an apodized chirped distributed Bragg reflector. Apodization of the chirped distributed Bragg reflector reduces the oscillations in the group delay of the optical pulse that would result if the optical pulse were reflected by a linearly chirped distributed Bragg reflector. Hence, distortion of optical pulses is reduced.

Reflection of optical pulses from a chirped distributed Bragg reflector results in broadening of the optical pulses due to an acquired chirp. Therefore, in another embodiment of the present invention, the time-delayed pulses output from the delay generator are passed through a dispersion compensating fiber, which provides correction for the acquired chirp.

The present invention is used to provide optical pulse position modulation for an analog signal. A stream of equally-spaced optical pulses is transmitted into a waveguide containing a chirped distributed Bragg reflector. The analog signal controls a modulation means that generates an electric field across the waveguide. The modulation means controls the intensity of the electric field and thus the delay provided by the waveguide. Each optical pulse in the stream of optical pulses is reflected by the chirped distributed Bragg reflector and acquires a delay corresponding to the analog signal.

DETAILED DESCRIPTION OF PREFERRED EMBODIMENTS

Figure 1:
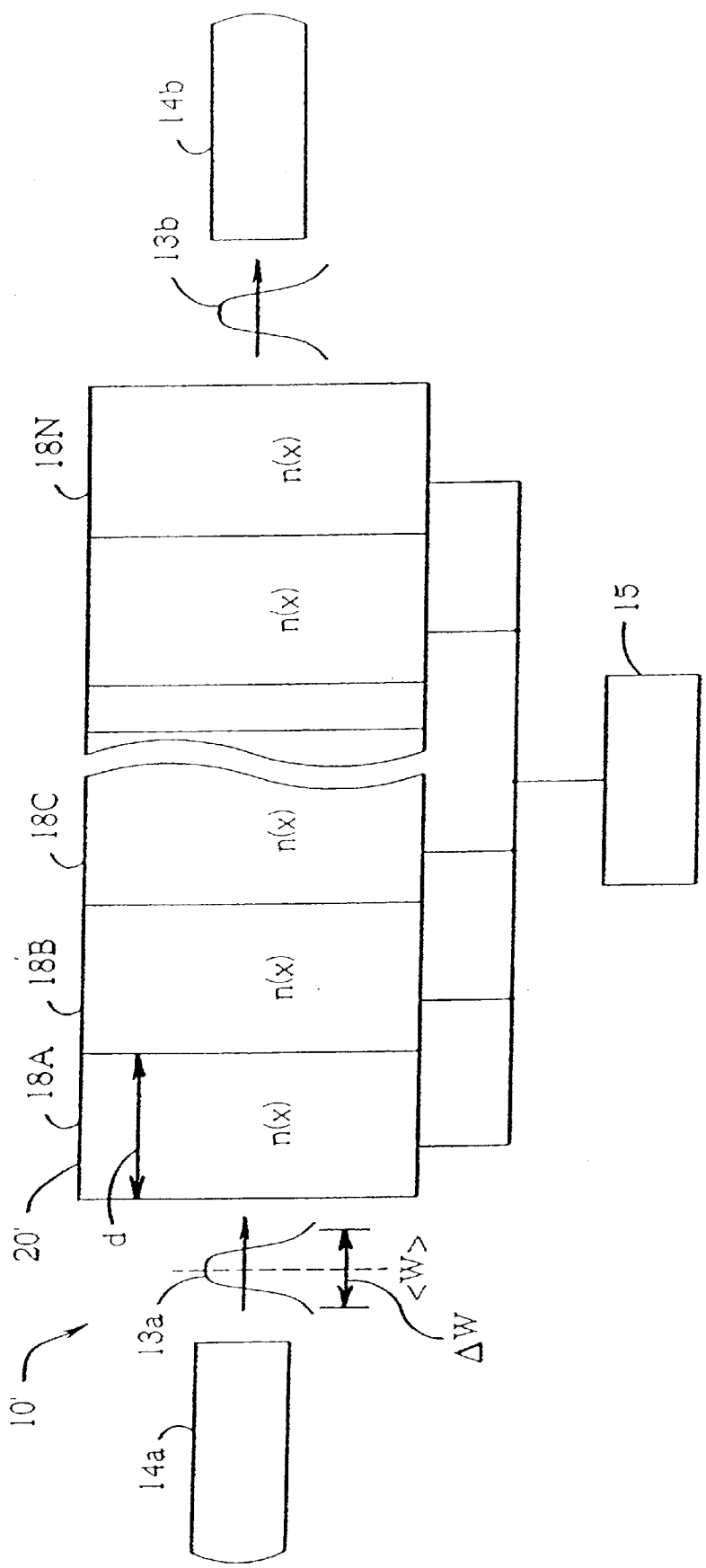
FIG. 1 (prior art) shows a photonic bandgap structure used for delaying optical pulses.

The present invention now will be described more fully hereinafter with reference to the accompanying drawings, in which preferred embodiments of the invention are shown. This invention may be embodied in many different forms and should not be construed as limited to the embodiments set forth herein. In the drawings, the thicknesses of layers and regions are exaggerated for clarity.

Figure 2:
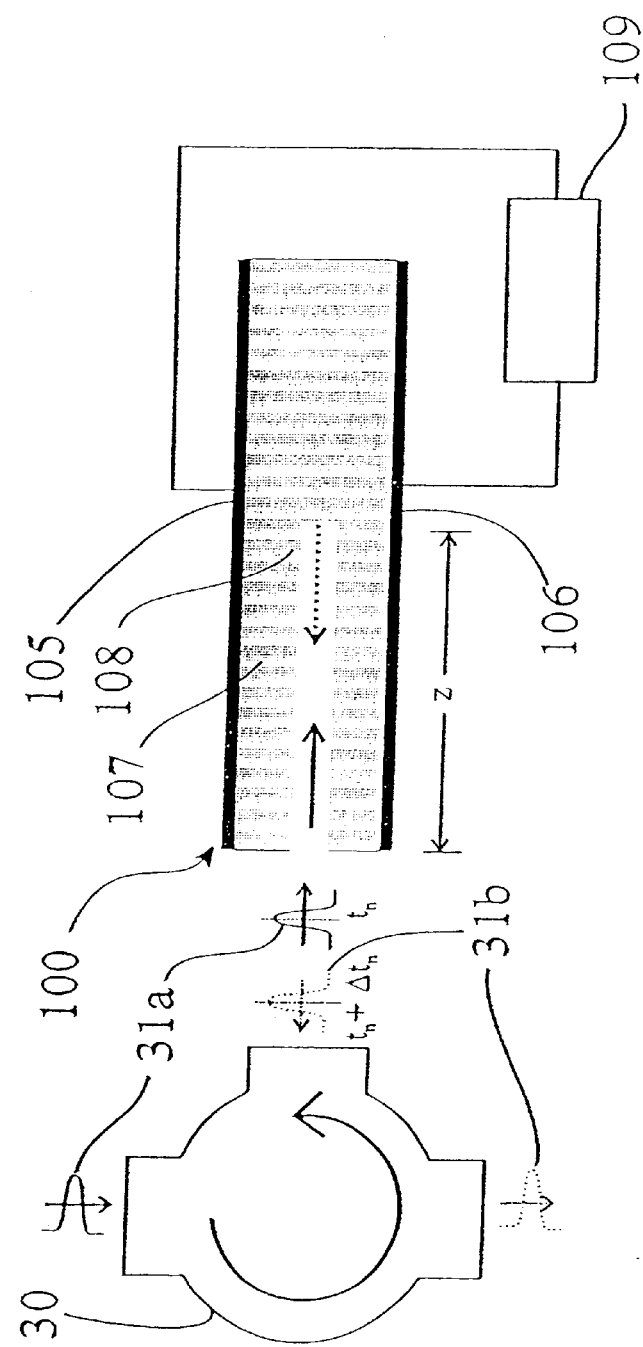
FIG. 2 shows a schematic representation of an optical delay generator in accordance with the present invention comprising a waveguide with a chirped distributed Bragg reflector and an optical circulator for directing pulses into and out of the waveguide.

Referring now to FIG. 2, a schematic representation of apparatus and methods for optical delay generation is shown. Referring to FIG. 2, a waveguide means 100 receives light pulses 31a at times $t_n$ and imparts a delay $\Delta t_n$ on each pulse to thereby produce reflected light pulses 31b at times $t_n + \Delta t_n$. Preferably, light pulses 31b are simply delayed versions of light pulses 31a such that the delayed pulses 31b replicate the original light pulses 31a in terms of pulse shape and have not acquired any pulse-to-pulse amplitude modulation.

Still referring to FIG. 2, the waveguide means 100 comprises one or more layers of electro-optically active material 107 with a varying refractive index. The present invention requires that the variations in the refractive index within the electro-optically active material form a chirped distributed Bragg reflector (C-DBR). The C-DBR reflects an optical signal of a specific wavelength after the optical signal has traveled a certain distance z within the waveguide means, as indicated by line 108. The construction and features of the C-DBR will be described in more detail below.

The index of refraction of electro-optically active material changes when an electrical field is applied. In FIG. 2, a means for generating an electric field across the electro-optically active material 107 is shown as being provided by an upper electrode 105 and a lower electrode 106 connected to a voltage source 109. As the electric field between the two electrodes changes, the index of refraction within the electro-optically active material will change. The change of the refractive index is generally proportional to the magnitude of the electric field and is represented by $dn=(dn/dE)dE$. As will be described below, changes in the refractive index result in changes in the distance in which an optical signal travels in the C-DBR before it is reflected, resulting in changes in the amount of delay applied to an optical signal.

Still referring to FIG. 2, the optical delay generator apparatus also includes means for directional coupling the optical signals into and out of the waveguide means A fiber optic circulator 30 or other conventional coupling means may be used. Ideally, the circulator or other coupling means is low loss and will not cause any pulse reshaping or pulse-to-pulse amplitude modulation.

Electro-optically active materials are well known in the art. However, for use in the present invention, the electro-optically active material must be such that a C-DBR can be formed within it. Also, the dn/dE factor should be as large as possible, so that the magnitude of the electric field can be kept as small as possible. Materials that provide such characteristics include lithium niobate ($LiNbO_3$), lithium tantalate ($LiTaO_3$), and lithium niobate doped with titanium. The electro-optically active material may also comprise an electro-refractive semiconductor C-DBR structure. A semiconductor C-DBR structure comprises several very thin layers of materials having different refractive indices. Each layer comprises semiconductor material known to exhibit an excitonic band just above the photon energy. With such material, the electrical field magnitude required to produce the desired refractive index change is reduced.

A periodic (or quasiperiodic) fluctuation in the core refractive index of optical media results in a "Bragg grating" or a "distributed Bragg reflector." The pattern of fluctuations behaves as a spectrally selective reflector for electromagnetic radiation. The reflection of a distributed Bragg reflector reaches its maximum at the wavelength $\lambda$ satisfying the Bragg condition:

$$\beta(\lambda)=\pi/\Lambda \qquad (1)$$

where $\beta(\lambda)$ is the wave number at the given wavelength and $\Lambda$ is the period of modulation of the distributed Bragg reflector.

Figure 3A:
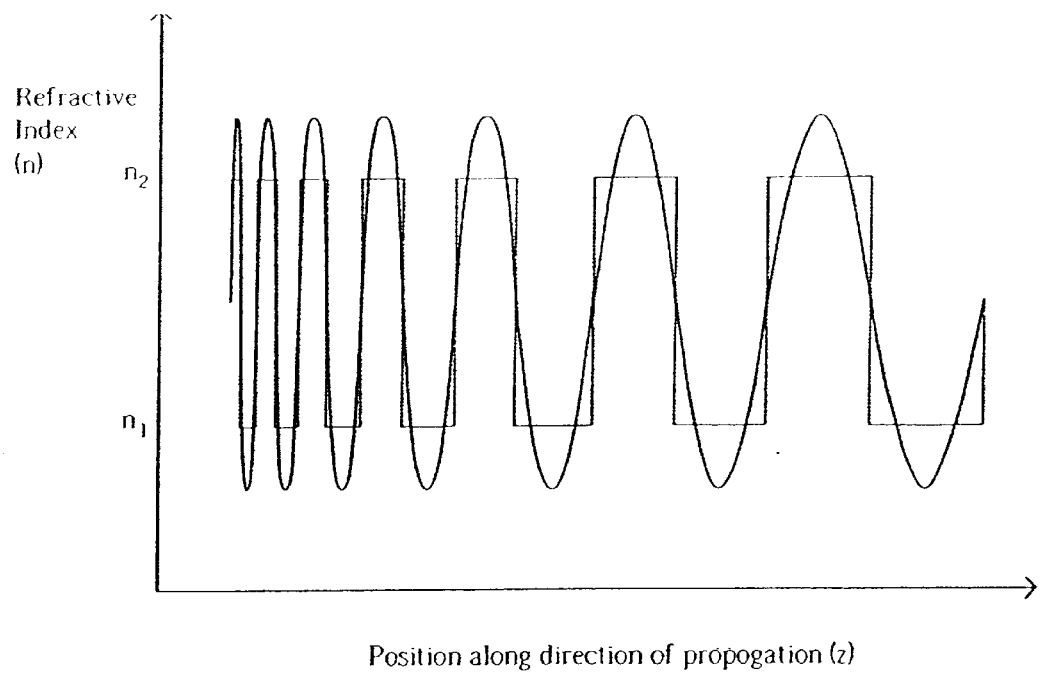
FIG. 3A shows a graphical representation of the variation in refractive index required for a chirped distributed Bragg reflector.

The present invention requires that the distributed Bragg reflector be quasiperiodic instead of periodic. That is, the period of the refractive index variation (i.e., the linear distance, between successive peaks and valleys of the refractive index profile) is not a constant, but instead changes in a predetermined fashion along the propagation axis of the distributed Bragg reflector. The propagation axis of the DBR is the direction in which the incident light travels. Such a Bragg reflector is referred to as a "chirped" distributed Bragg reflector. Preferably, the present invention utilizes a quasiperiodic variation in the refractive index in which the period increases or decreases as an approximately linear function of position along the propagation axis, resulting in a linearly chirped distributed Bragg reflector. FIG. 3A shows a "chirped" variation of the refractive index n as a function of position z along the propagation axis.

As indicated above, a chirped distributed Bragg reflector is created in electro-optically active material by modulating the refractive index within the material. Creation of chirped distributed Bragg reflectors is well known in the art. U.S. Pat. No. 4,953,939, issued Sep. 4, 1990 to R. Epworth, describes several methods for creating chirped distributed Bragg reflectors within optical fibers. All of the methods disclosed by Epworth describe the creation of quasi-periodic corrugations within the walls of the optical fiber, where the wall of the fiber is the interface between a core and a cladding within the fiber. These methods for creating a chirped distributed Bragg reflector within optical fibers would also be used to create chirped distributed Bragg reflectors within straight waveguides made from electro-optically active material such as lithium niobate or lithium tantalate as used in some embodiments of the present invention. It is also known in the art that a chirped distributed Bragg reflector will result when a tapered waveguide contains periodic corrugations on its walls, where the period of the corrugations roughly corresponds to the Bragg wavelength.

Figure 4:
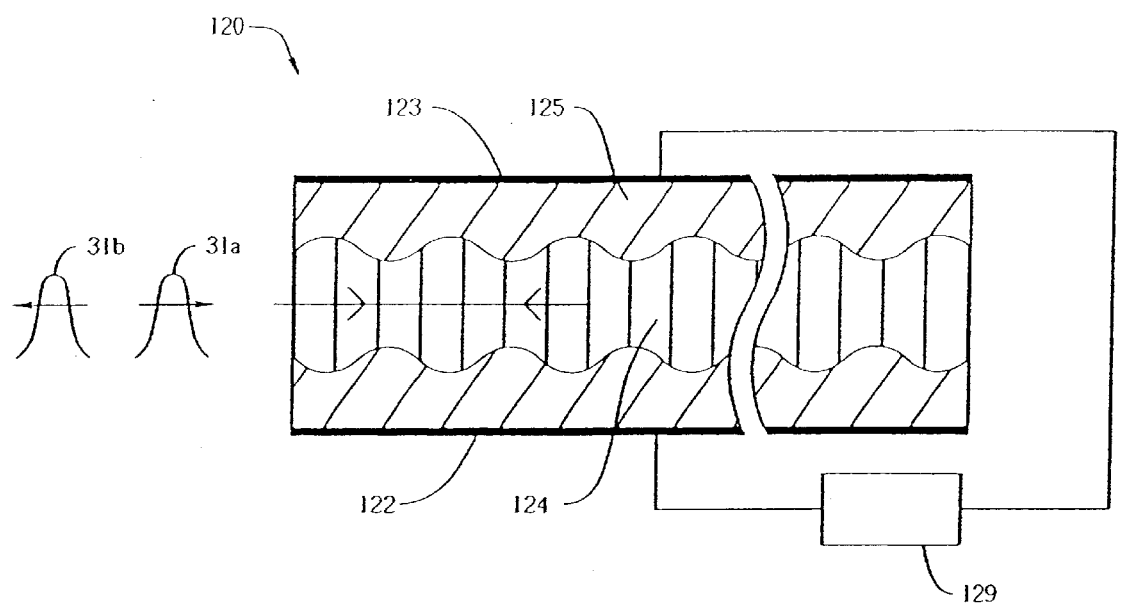
FIG. 4 shows an alternative embodiment of the present invention comprising a straight waveguide where the core width varies quasiperiodically to create a chirped distributed Bragg reflector.
Figure 5:
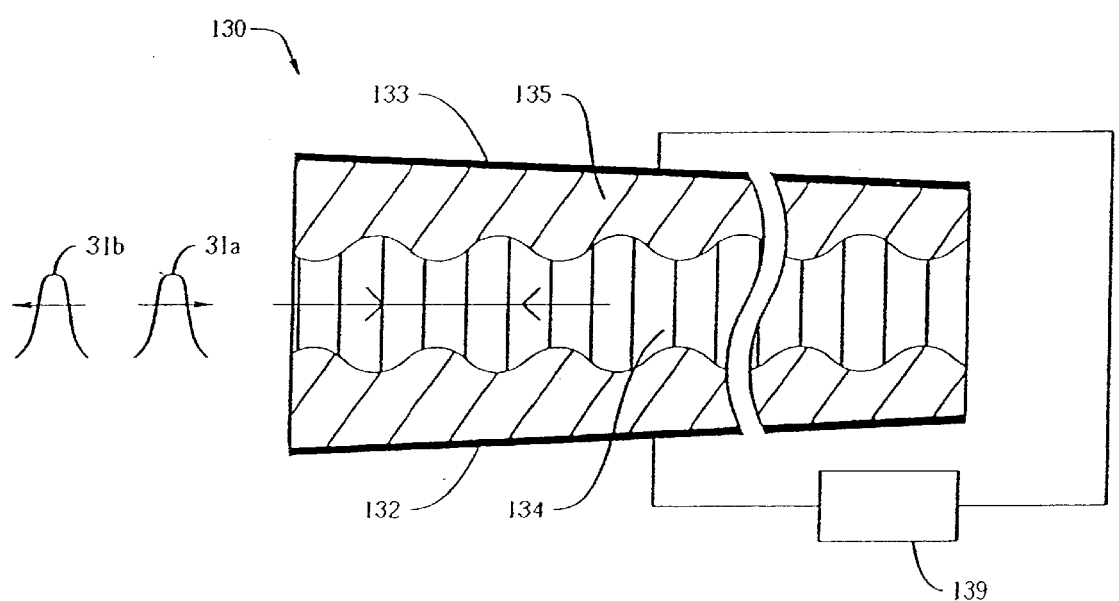
FIG. 5 shows another embodiment of the present invention comprising a tapered waveguide where the core width varies periodically to create a chirped distributed Bragg reflector.

FIG. 4 illustrates an embodiment of the present invention which uses a straight waveguide. In FIG. 4, a straight waveguide 120 has a core 124 and a cladding 125. The waveguide 120 has been constructed such that width of the core 125 varies in a quasiperiodic fashion so as to create a chirped distributed Bragg reflector. The waveguide 120 is sandwiched by a top electrode 123 and a bottom electrode 122, which are connected to a voltage source 129 to generate a voltage and thus an electric field across the waveguide. Light pulses 31a enter one end of the waveguide 120 and are reflected by the chirped distributed Bragg reflector within the waveguide 120. An alternative embodiment is shown in FIG. 5, where a tapered waveguide 130 with a core 134 and a cladding 135 is constructed such that the width of the core 134 varies in a periodic fashion.

Figure 6:
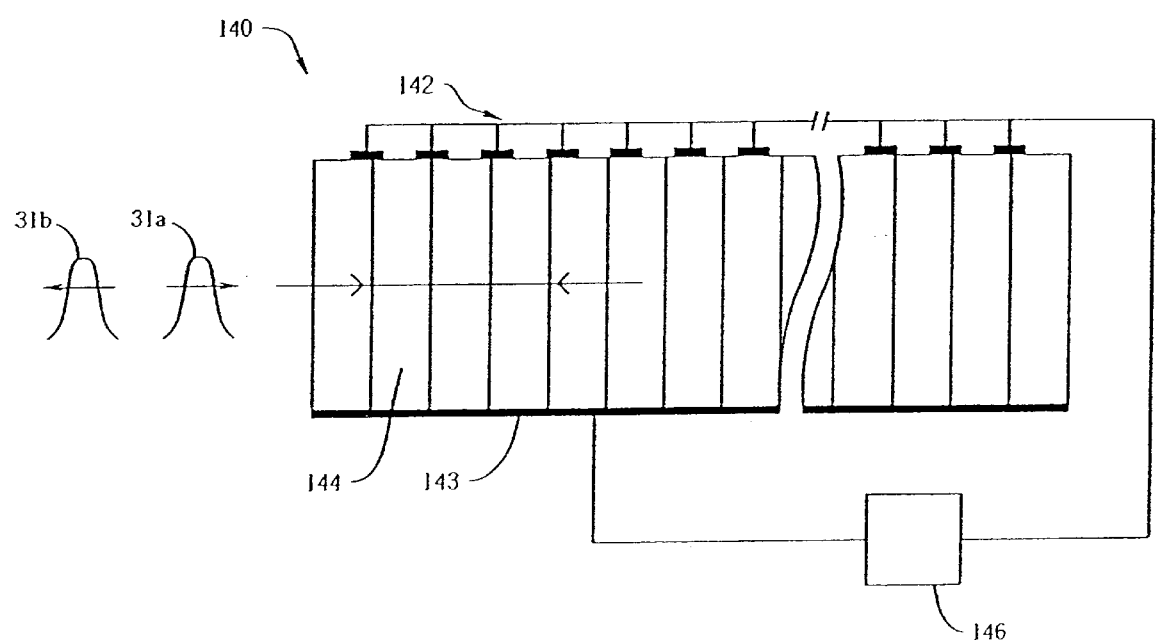
FIG. 6 shows another embodiment of the present invention comprising a waveguide with a plurality of electrodes where variations in the electric field generated by the separate electrodes create a chirped distributed Bragg reflector.

A method known in the art as polling also creates a chirped distributed Bragg reflector. In polling, a quasi-periodic DC electric field is applied along a waveguide constructed from electro-optically active material. The quasi-periodic variations in the DC electric field cause quasi-periodic variations in the local index of refraction, resulting in a chirped distributed Bragg reflector. FIG. 6 illustrates an embodiment of the present invention that uses polling. A waveguide 140 contains electro-optically active material 144 sandwiched between a plurality of top electrodes 142 and a bottom conductor 143. A voltage source 146 connects to the plurality of top electrodes 142 and the bottom conductor 143 so as to provide an electric field between each top electrode 142 and the bottom conductor 143. The voltage source 146 controls the voltage at each electrode so as to provide a voltage that is the sum of a two voltage components as shown below:

$$V_i = V_{uniform} + V_{poll}(i)$$

where $V_i$ is the total applied voltage at the ith electrode, $V_{uniform}$ is a voltage to be applied uniformly across the waveguide and $V_{poll}(i)$ is a voltage to be applied at the ith electrode to achieve polling. The first voltage component provides a uniform electric field that would result in a uniform change in the index of refraction along the waveguide 140 in the absence of the second voltage component. Thus, the first voltage component controls the delay provided by the waveguide. The second voltage component provides an electric field that varies quasi-periodically along the length of the waveguide so as to result in a quasi-periodic variation in the index of refraction within the waveguide 140 in the absence of the first voltage component. Thus, the second voltage component creates a chirped distributed Bragg reflector within the waveguide.

Figure 7:
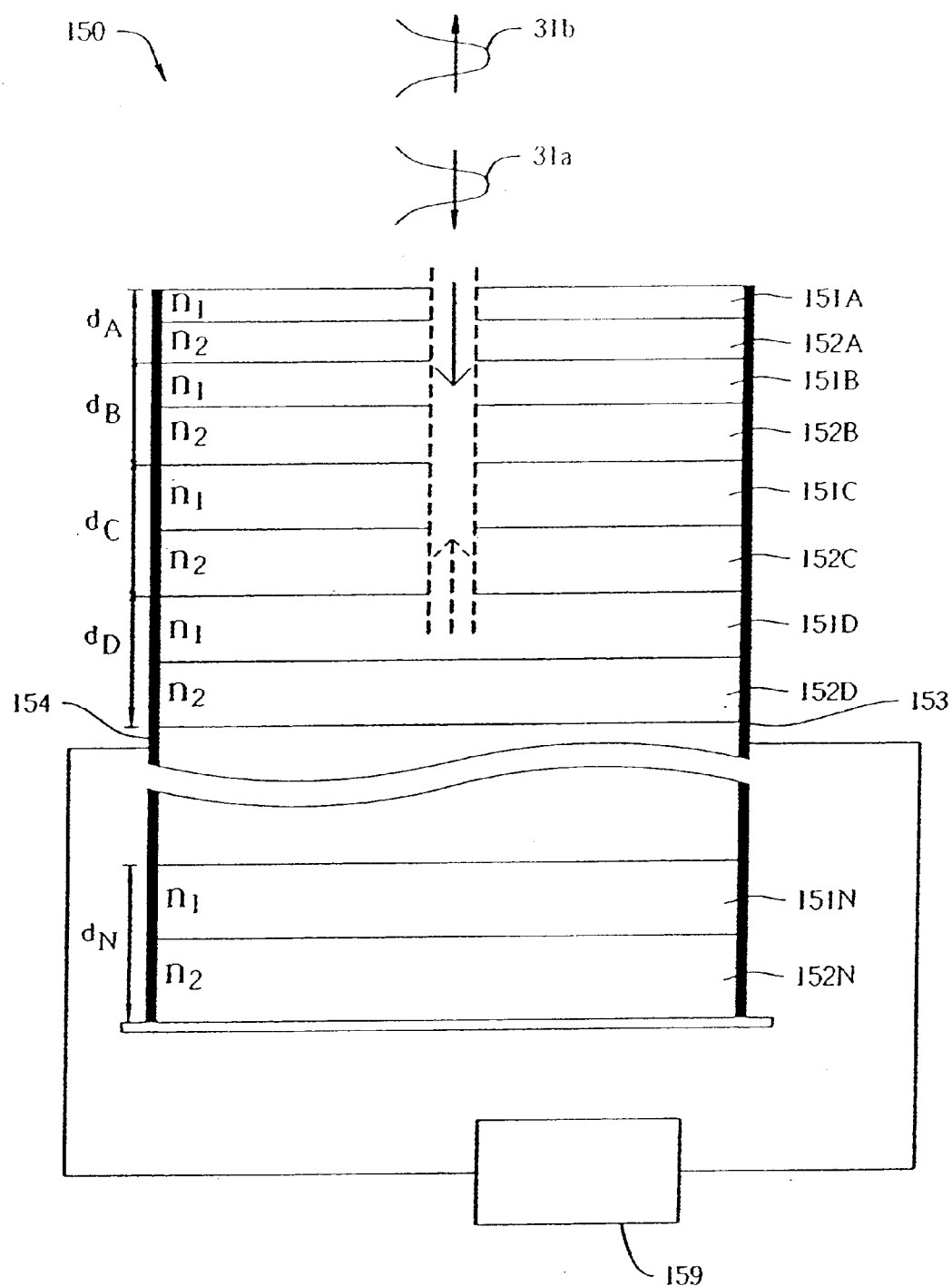
FIG. 7 shows an embodiment of the present invention comprising a semiconductor chirped distributed Bragg reflector structure where layers of varying width and refractive index form the chirped distributed Bragg reflector.

If a semiconductor C-DBR structure is used to provide the waveguide means of the present invention, the chirped distributed Bragg reflector is formed by controlling the refractive index within the individual layers of the semiconductor structure. One such semiconductor structure can be formed from alternating layers of low refractive index aluminum arsenide and high refractive index aluminum gallium arsenide. FIG. 7. shows an embodiment of the present invention using a semiconductor structure with alternating low and high refractive index layers. In FIG. 7, alternating layers of low refractive index material (151A . . . 151N) and high refractive index material (152A . . . 152N) are used to form an electro-optically active waveguide. Each alternation between a low index layer and high index layer is a single refractive index period. The thickness of the alternating layers ($d_A \ldots d_N$) is increased in a quasiperiodic fashion to provide a linearly increasing change in each refractive index period. A uniform electric field, controlled by a voltage source 159 and applied across the structure by a first electrode 153 and a second electrode 154, controls the amount of delay provided by the structure.

A chirped distributed Bragg reflector can also be formed within a single layer of electro-optically active material by controlling the doping of that layer of material. For example, the refractive index of a lithium niobate waveguide can be modulated by doping the lithium niobate periodically or quasiperiodically with titanium. A chirped distributed Bragg reflector will result if the periodicity of the doping satisfies the Bragg condition described above.

To further describe the apparatus and method of the present invention, reference is made to the straight waveguide embodiment of the present invention, as shown in FIG. 4. In this case, the wave number satisfying the Bragg condition is approximately given by $\beta=2\pi/n\lambda$, where n is the effective refraction index. In a linearly chirped DBR, $$\Lambda(z) = \Lambda_0 + \Lambda' z \quad (3)$$

where $\Lambda'$ is the chirp parameter, and z is the classical turning point for a given wavelength. The chirp parameter $\Lambda' = \Delta\Lambda/L$ where $\Delta\Lambda$ is the change in the C-DBR period across a C-DBR structure of total length L. The turning point z is found from the Bragg condition equation:

$$n\lambda = 2\pi/\beta = 2\pi/(\pi/\Lambda(z)) = 2(\Lambda_0 + \Lambda' z) \quad (4)$$

The group delay introduced by a chirped distributed Bragg reflector is approximately $$t_d = 2nz/c \quad (5)$$

where c is the speed of light. This equation demonstrates that the group delay can be changed by changing the effective refractive index of the waveguide. If the index of refraction is changed as a result of the application of an electric field to an electro-optically active material, the group delay will be changed as shown in the equation below:

$$dt_d = (2dn/c\Lambda')(n\lambda - \Lambda_0) \approx 2(\Lambda_0/c\Lambda')dn \quad (6)$$

The change in the index of refraction will be nearly instantaneous to the change in the electric field, thus providing the capability to quickly change the delay provided by the present invention. Changes in the electric field, however, will be limited by the means used to apply and control the electric field. Control electronics, impedance of electrodes, and other electrical effects may limit the speed at which the present invention operates, but the present invention itself can provide nearly instantaneous change in applied delay. Electro-optical modulators that do not use a chirped distributed Bragg reflector have been demonstrated to operate at 50 GHz, so the present invention is also expected to provide operation up to 50 GHz or higher.

Figure 3B:
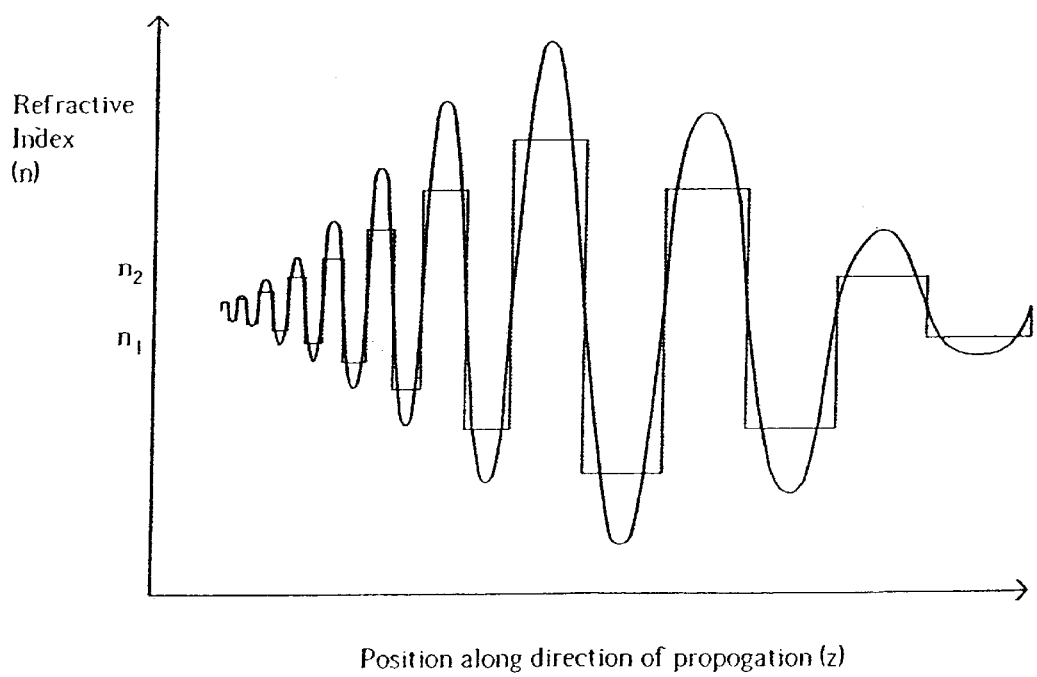
FIG. 3B shows a graphical representation of the variation in refractive index required for an apodized chirped distributed Bragg reflector.

The classical description of group delay presented above is only an approximation. For example, it does not account for oscillations in the group delay that result from a linearly chirped grating. However, a correctly engineered chirp will eliminate the resonances and a linear group delay dependence is realized. One such chirped grating that will reduce the oscillations is an apodized chirped distributed Bragg reflector. In an apodized chirped distributed Bragg reflector, the amplitude of the chirped index of refraction is tapered from a minimum to a maximum and then back to a minimum within the chirped distributed Bragg reflector. FIG. 3B illustrates the refractive index variation for an apodized chirped distributed Bragg reflector.

Proper choice of the length and chirp of the C-DBR provides the desired delay range for optical pulses of a certain duration, and thus provides the capability for pulse position modulation. To illustrate the calculations used, a delay generator based on a straight waveguide with a linearly varying C-DBR period is used, as shown in FIG. 4. The electro-optically active material used in the waveguide is $LiNbO_3$, although, as indicated previously, other materials may be used. Any unwanted resonances in the group delay are eliminated by the procedure previously described.

The average C-DBR period is determined by the wavelength of the optical source and is calculated from the equation for the Bragg condition. For an optical wavelength $\lambda=1.55$ mm and the LiNbO$_3$ index of refraction $n_e=2.2$, the average C-DBR period $\Lambda_0=n_e\lambda/2=1.75$ mm. The required differential group delay $dt_p$ determines the chirp for a given differential index of refraction dn. It is well known in the art that for LiNbO$_3$, the differential index of refraction as a function of the applied electric field is derived from the equation:

$$dn = r_{33} n_e^3 dE_z \qquad (7)$$

where the electro-optic coefficient $r_{33}=30.8\times10^{-12}$ m/V. Assuming a 3 mm-wide waveguide and 5 V of applied voltage, the differential index of refraction dn=$5.5\times10^{-4}$. If a group delay $dt_p=5$ ps is required, the chirp of the C-DBR $\Lambda'=10^{-2}$ $\mu$m/cm.

The delay generator must have sufficient bandwidth to reflect short optical pulses. It is well known in the art that the approximate spectral width of a chirped distributed Bragg reflector $$\Delta\lambda_{C\text{-}DBR} = 2\Lambda'L/n_e, \qquad (8)$$

where L is the total length of the distributed Bragg reflector. To reflect the full spectrum of the optical pulses transmitted into the delay generator containing the distributed Bragg reflector, the length of the reflector L must be greater than $\Delta\lambda n_e/2\Lambda'$. For example, the spectral width of a Gaussian pulse of t=0.3 ps duration and wavelength $\lambda=1.55$ mm is $\Delta\lambda_t=0.44\lambda^2/ct=12$ nm. For the delay generator using LiNbO$_3$ previously described, the length of the DBR must exceed L=$\Delta\lambda_t n_e/2\Lambda'\approx1.3$ cm. Electro-optical waveguide modulators with L=1 cm and longer are common in the art.

The present invention provides optical pulse position modulation by using a modulation means to control the optical delay provided by the chirped distributed Bragg reflector as shown in FIG. 2. For pulse position modulation, a stream of equally spaced optical pulses is transmitted into the input of an optical circulator 30. The optical circulator than sends these pulses into the waveguide 100 comprising electro-optically active material and containing a chirped distributed Bragg reflector. An analog signal to be pulse positioned modulated controls the voltage source 109. The voltage source 109 controls an electric field within the waveguide 100, and thus controls the delay imparted on each optical pulse 31a transmitted into the waveguide 100. Each optical pulse 31a will acquire a delay corresponding to the delay required to pulse position modulate the analog signal, and will be reflected out of the waveguide 100 and transmitted out of the circulator 30 as a delayed pulse 31b.

Figure 8:
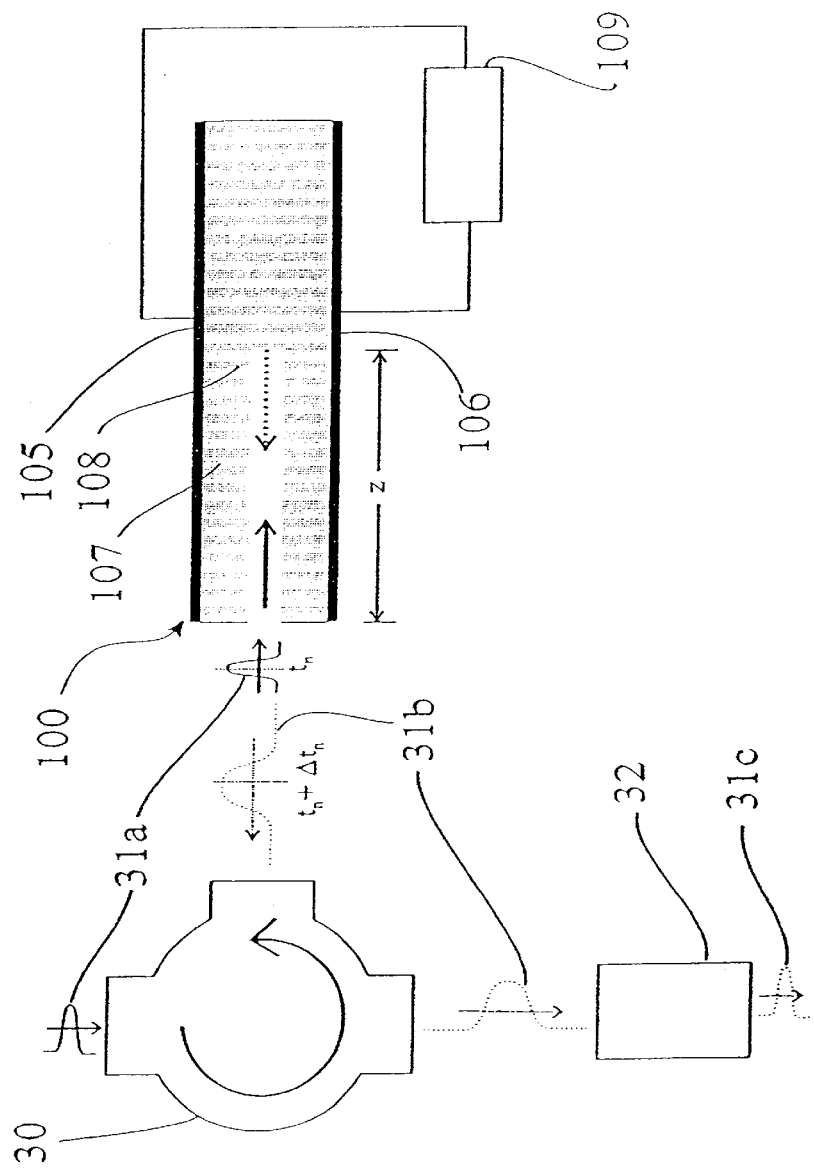
FIG. 8 shows another embodiment of the present invention where an optical signal reflected from a chirped distributed Bragg reflector is directed into a dispersion compensating filter.

The optical pulses reflected by the described delay generator are broadened due to the chirp imposed by the C-DBR. This broadening or "chirping" of the pulses may reduce the performance of a pulse position modulation system provided by the present invention. However, this chirp can be removed by passing the chirped pulses through a dispersion compensating fiber as is customary in the art. FIG. 8 demonstrates one way in which the acquired chirp can be removed. In FIG. 8, the delayed optical pulses output by the coupler 31b are sent through a dispersion compensating fiber 32. Dispersion compensating filters are well known in the art. The filtered pulses 31c output by the dispersion compensating filter 32 should match the optical pulses 31a input to the system in amplitude and pulse width.

Pulse position modulation provided by the present invention minimizes pulse-to-pulse amplitude or shape modulation. As shown in the example previously described, the change in the refraction index, dn=$5.5\times10^{-4}$<<$n_e=2.2$ and the accompanying shift of the C-DBR band to achieve the desired group delay $dt_d=5$ ps are very small, that is $d\lambda_t/d\lambda_t \propto dn/n_e<<1$. Hence, attenuation of the optical signal due to the spectral changes in frequency response of the waveguide resulting from the changes in the refraction index should be negligible.

From the foregoing description, it will be apparent that the present invention has a number of advantages, some of which have been described above, and others of which are inherent in the embodiments of the invention described above. Also, it will be understood that modifications can be made to the optical delay generator and method for performing pulse position modulation described above without departing from the teachings of subject matter described herein. As such, the invention is not to be limited to the described embodiments except as required by the appended claims.

What is claimed is:

1. A method for delaying optical pulses comprising the steps of:
    coupling said optical pulses into a waveguide comprising electro-optically active material, said waveguide having a chirped distributed Bragg reflector formed within said electro-optically active material that reflects said optical pulses at a turning point within said waveguide and said electro-optically active material having an index of refraction;
    applying an electric field to said electro-optically active material to change said index of refraction of said electro-optically active material so as to change said turning point of said chirped distributed Bragg reflector, the change of turning point proportional to the amount of desired pulse delay; and,
    coupling said optical pulses reflected from said chirped distributed Bragg reflector out of said waveguide.

2. The method of claim 1 wherein said chirped distributed Bragg reflector is an apodized chirped distributed Bragg reflector.

3. The method of claim 1 further comprising the step of:
    transmitting said optical pulses coupled out of said waveguide into a dispersion compensating filter.

* * * * *